United States Patent [19]

Kobayashi et al.

[11] Patent Number: 4,534,010
[45] Date of Patent: Aug. 6, 1985

[54] FLOATING POINT TYPE MULTIPLIER CIRCUIT WITH COMPENSATION FOR OVER-FLOW AND UNDER-FLOW IN MULTIPLICATION OF NUMBERS IN TWO'S COMPLIMENT REPRESENTATION

[75] Inventors: Masahito Kobayashi, Yokohama; Narimichi Maeda, Tachikawa; Yoshimune Hagiwara, Kodaira; Takashi Akazawa, Kodaira; Shizuo Sugiyama, Kodaira, all of Japan

[73] Assignees: Hitachi, Ltd.; Hitachi Denshi Kabushiki Kaisha, both of Tokyo, Japan

[21] Appl. No.: 313,507

[22] Filed: Oct. 21, 1981

[30] Foreign Application Priority Data

Oct. 31, 1980 [JP] Japan ................... 55-152053

[51] Int. Cl.³ ............................ G06F 7/52
[52] U.S. Cl. ..................... 364/748; 364/745
[58] Field of Search ................. 364/748, 745

[56] References Cited

U.S. PATENT DOCUMENTS 3,699,326 10/1972 Kindell et al. ............... 364/745
3,871,578 3/1975 Van De Goor et al. ........ 364/748
4,295,203 10/1981 Joyce ......................... 364/748
4,429,370 1/1984 Blau et al. ................... 364/748

OTHER PUBLICATIONS

Koral et al., "Single Chip Multipliers for Digital Signal Processing" *Conference: 1978 WESCON Tech. Papers,* pp. 1–7, Sep. 12–14, 1978, Los Angeles, CA.
Nguyen, "Practical Hardware Solutions for 2's Complement Arithmetic Problems" *Computer Design,* Jul. 1979, pp. 105–112.
Ahearn et al., "Characteristic Overflows or Underflow Detection in Floating Point Operations" *IBM Tech. Discl. Bulletin,* vol. 7, No. 8, Jan. '65, pp. 664–665.

*Primary Examiner*—David H. Malzahn
*Attorney, Agent, or Firm*—Antonelli, Terry & Wands

[57] ABSTRACT

According to the present invention, a normalized floating point type multiplier circuit including a multiplier for mantissa's multiplication and an adder for exponent's addition is equipped with both a detector circuit for detecting over- and under-flows and a compensation circuit for compensating the output of said multiplier without any programming, when the over- and under-flows are detected, so that the multiplying speed can be improved.

4 Claims, 5 Drawing Figures

FLOATING POINT TYPE MULTIPLIER CIRCUIT WITH COMPENSATION FOR OVER-FLOW AND UNDER-FLOW IN MULTIPLICATION OF NUMBERS IN TWO'S COMPLIMENT REPRESENTATION

BACKGROUND OF THE INVENTION (1) Field of the Invention

The present invention relates to a floating point type multiplier circuit and, more particularly, to a floating point type multiplier circuit to be used in a high speed digital signal processor which aims at real time access of data having a wide dynamic range (i.e., the maximum amplitude that can be taken by the data).

(2) Description of the Prior Art

A floating point type multiplier circuit is constructed of a fixed point multiplier for exclusive use of mantissa arithmetic and an adder for exclusive use of exponent arithmetic. Specifically, if two numbers to be multiplied are expressed by $A_1 = M_1 \cdot 2^{e_1}$ and $A_2 = M_2 \cdot 2^{e_2}$, the result of the multiplication is expressed by $A_0 = A_1 \cdot A_2 = M_1 \cdot M_2 \cdot 2^{e_1 + e_2}$ so that the multiplication of $M_1 \cdot M_2$ and the addition of $e_1 + e_2$ are performed. Here, $M_1$ and $M_2$ designate mantissas, and $e_1$ and $e_2$ designate exponents. In the multiplication of floating points, the mantissas of two inputs are so normalized as to maintain the effective length maximum. Specifically, "1" and "0" result in case the bit appearing next to the MSB (which is the abbreviation of "Most Significant Bit") is positive and and negative, respectively, and the point is located between the MSB and the second bit.

In case such multiplier is constructed of a digital circuit of binary number, the bit length of the mantissa and exponent is fixed for convenience of the circuit construction. Therefore, since the result of the multiplication, i.e., the product has to be expressed by a predetermined bit length, there arises a problem of "flow" (e.g., over-flow or under-flow).

In case the result of the multiplication is to be normalized, moreover, the mantissa is shifted so that the exponent has to be accordingly added and subtracted. If, in this case, the exponent fails to fall within the range expressed by a formal bit-length, the problem of the flow also results.

If the flow takes place in the mantissa and the exponent in that way, there has been adopted according to the prior art a method in which the flow is detected by flag and is compensated by a programming. As a result, it takes a considerable time to execute the program for compensating the over-flow, thus raising a defect that a high speed arithmetic cannot be accomplished. Especially in a real time access system, in which the input and output have to be processed with an identical time relationship, such as a communication equipment, a higher speed signal processor becomes necessary, and the speed-up of the multiplier especially taking the time is required.

SUMMARY OF THE INVENTION

It is, therefore, an object of the present invention to realize a floating point multiplication the flow of which is processed at a high speed without any programming.

Another object of the present invention is to realize a circuit which can promptly process the flow occurring in the floating point multiplication.

In order to achieve the above-mentioned objects, according to the present invention, there is provided a multiplier circuit for multiplying the two numbers of a floating point composed of mantissa and exponent of a predetermined bit length, which circuit is characterized in that a flow detector is provided at the mantissa or exponent of an output so that a flow compensation circuit may be driven by the signal detected by the flow detector.

The above-mentioned and other features and objects of the present invention will become more apparent with reference to the following description taken in conjunction with the accompanying drawings.

DESCRIPTION OF THE PREFERRED EMBODIMENTS

Figure 1:
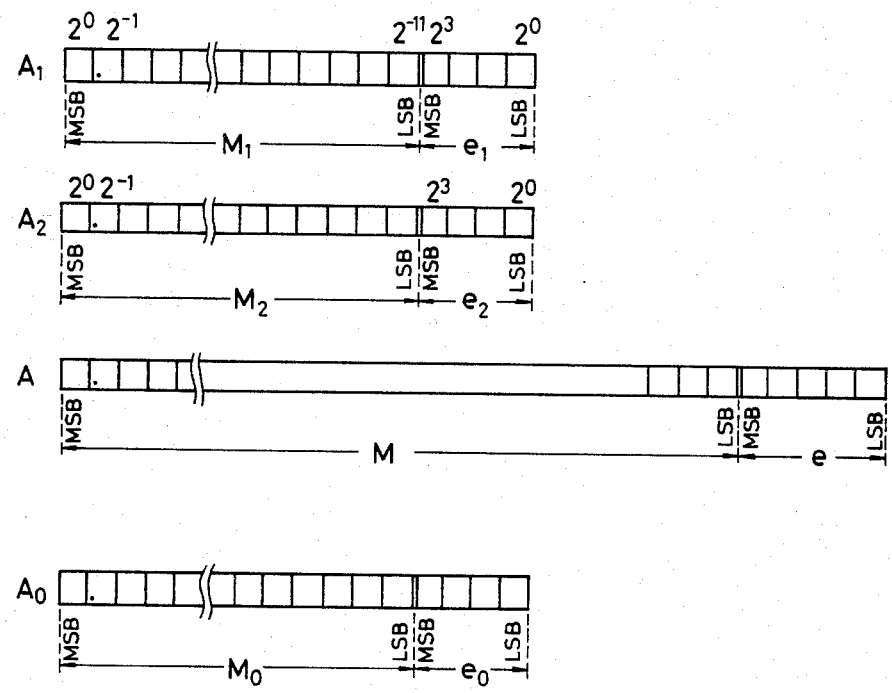
FIG. 1 is a diagram showing the bit construction of input and output data in a floating point multiplication.

Before entering into the description of the embodiments, the concept of the present invention will be first explained in the following. FIG. 1 shows the bit constructions of two numbers $A_1$ and $A_2$ to be multiplied and their product $A = A_1 \cdot A_2$. If the mantissa and exponent of each number are designated at M and e, respectively, the two numbers are expressed by $A_1 = M_1 \cdot 2^{e_1}$ and $A_2 = M_2 \cdot 2^{e_2}$, and the product is expressed by $A = M \cdot 2^e$ (i.e., the true value). The suffixes of the respective symbols discriminate the respective numbers. In the floating point multiplication, the mantissas $M_1$ and $M_2$ of the two numbers $A_1$ and $A_2$ are normalized so as to maximize the effective lengths. Moreover, the MSB indicates the sign, and the point is located between the MSB and the next bit. Therefore, when a binary number is expressed by a two's complement expression, the mantissas $M_1$ and $M_2$ fall within the ranges defined by the following inequalities:

$$-2^0 \leq M_1 < -2^{-1} \quad 2^{-1} \leq M_1 < 2^0$$
$$\text{or}$$
$$-2^0 \leq M_2 < -2^{-1} \quad 2^{-1} \leq M_2 < 2^0.$$

From the construction (which expresses the mantissa and exponent) of a multiplier circuit, on the other hand, the bit lengths are constructed of predetermined bit lengths m and n (e.g., m=12 and n=4 in the cases of the two numbers $A_1$ and $A_2$ of FIG. 1), respectively. In case there is no limit to the bit construction, the product A (i.e., the true product value) of those two input numbers $A_1$ and $A_2$ is expressed by a mantissa having 24 bits and an exponent having five bits. For the convenience of the circuit construction, however, the output of the multiplier circuit is constructed of the same mantissa of m (=12) bits and the same exponent of n (=4) bits as those of the numbers $A_1$ and $A_2$, as is expressed by $A_0 = M_0 \cdot 2^{e_0}$ of FIG. 1. The point of the output at that time is located subsequent to the MSB. As a result, the following flow takes place:

(1) Exponent's Over-Flow: The exponent e becomes equal to or larger than $2^{n-1}$.

(2) Exponent's Under-Flow: The exponent e becomes equal to or smaller than $-2^{n-1}$.

(3) Mantissa's Over-Flow: When both the two numbers $A_1$ and $A_2$ are $-1$, their product is the binary number of 1.0000 - - -, notwithstanding that its true value is 1, in case the arithmetic of the two's complement expression is performed, so that its value is mistaken to be $-1$ because the MSB takes the value "1".

According to the floating point type multiplier circuit of the present invention, the above-mentioned problem of the over-flow compensate by means of a circuit for detecting the respective over-flows and a compensation circuit having the following functions but made operative not to program the over-flow detected:

(1') When the exponent's over-flow takes place, the exponent $e_0$ is wholly set at the maximum $2^{n-1}-1$ that can be displayed by n bits, and the mantissa $M_0$ is obtained by shifting (or carrying) the mantissa one bit to the left when the exponent e is $2^{n-1}$ and when the mantissa M is not normalized. In other cases, the mantissa M is compensated without any change in the sign (MSB) bit to the mantissa $M_0$ (e.g., 0.11–1 in the positive case or 1.00–0 in the negative case) which takes the maximum absolute value.

(2') For the under-flow of the exponent, the mantissa is shifted (or carried down) to the right by the $(e_s-e)$ bits which is determined by subtracting the true exponent value e from a predetermined exponent $e_s$ which can be expressed by the exponent. The exponent is compensated to $e_s$. For example, the above-mentioned $e_s = -2^{n-1}$ is held, and the mantissa is shifted (or carried) to the right by the $(-2^{n-1}-e)$ bits. Alternatively, as will be described in the embodiments of the present invention, the mantissa may be shifted to the right by $(\alpha-e)$ bits in an adder for adding the result of the floating point multiplication and another number, if the exponent of the above-specified another number is designated at $\alpha$.

(3') For the mantissa's over-flow, either of the following means is taken:

(3-1)' The first means is to shift (or carry down) the mantissa one bit to the right and to add one to the exponent; and (3-2)' The second means is to express the mantissa $M_0$ in $2^0 - 2^{-(m-1)}$ and to perform no compensation of the exponent. Since this means can be used with a exponent's over-flow compensation circuit, as will be explained in a later-described embodiment, the circuit construction can be made more advantageous than the first means.

Figure 2:
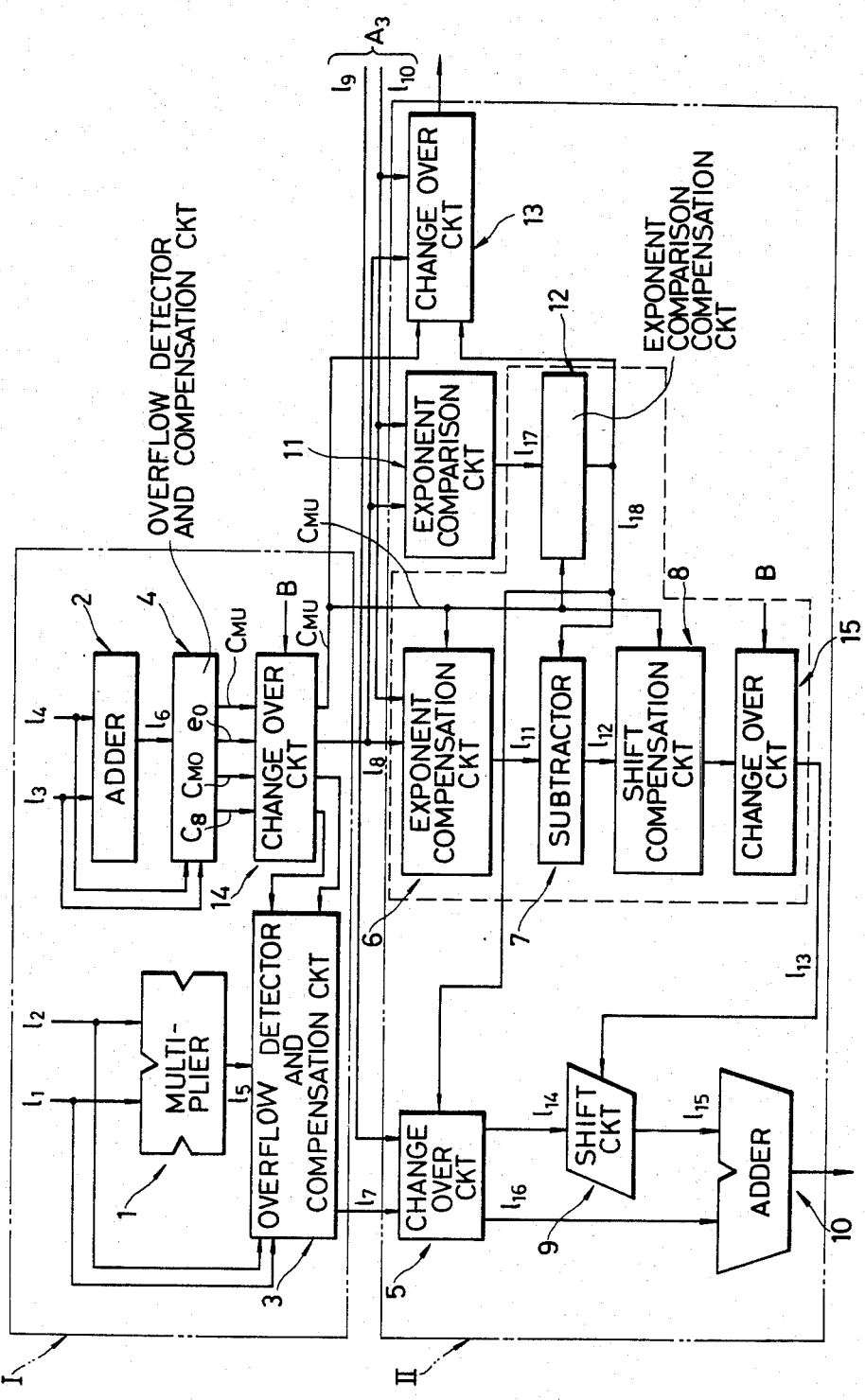
FIG. 2 is a block diagram showing the construction of one embodiment of a floating point type multiplier circuit according to the present invention.

FIG. 2 is a block diagram showing the construction of one embodiment of the floating point type multiplier circuit of the present invention constructed on the basis of the concept thus far described. The circuit of the present embodiment is constructed of first and second arithmetic circuits I and II. The first arithmetic circuit I is a circuit for detecting the floating point multiplication and the over-flow and for performing the compensations of an exponent and a mantissa due to the mantissa's over-flow. The second arithmetic circuit II is a circuit for performing the compensations of an exponent and a mantissa due to the exponent's under-flow. In the present embodiment, moreover, the compensation circuit due to the exponent's under-flow, i.e., the second arithmetic circuit II is made to act as an arithmetic circuit for adding the output of the first arithmetic circuit I and another input $A_3$ (which is composed of a mantissa $l_9$ and an exponent $l_{10}$) and is made operative to perform the floating point arithmetic and the fixed point arithmetic. The operations of the respective circuit constructions will be described hereinafter.

A floating point arithmetic multiplier 1 is fed with signals, which correspond to the mantissas $M_1$ and $M_2$ of the two numbers $A_1$ and $A_2$ having such bit constructions as are shown in FIG. 1, as input signals $l_1$ and $l_2$, respectively. The multiplier 1 feeds out the result of multiplication $M_0$ as an output signal $l_5$ (including the case of the flow). On the other hand, the signals which correspond to the exponents $e_1$ and $e_2$ of the above two numbers $A_1$ and $A_2$ are fed as input signals $l_3$ and $l_4$, respectively, to a floating point arithmetic type adder 2. The adder 2 feeds out the result of addition e as an output signals $l_6$ (including the case of the flow).

Numeral 4 indicates an overflow detector and compensation circuit for detecting the flow of the exponent e and for compensating the exponent for the exponent's over-flow. The overflow detector and compensation circuit 4 feeds out not only signals $C_8$, $C_{MO}$ and $C_{MU}$ respectively indicating that the exponent e is $2^{n-1}$, not less than $2^{n-1}$ (in the case of the exponent's over-flow) and smaller than $-2^{n-1}$ (in the case of the exponent's under-flow) when the exponent indicating bit length is n (=4 in the embodiment) but also the compensated exponent $e_0$ when the exponent e is not less than $2^{n-1}$.

Numeral 14 indicates a change over circuit for effecting the interchange between the floating point multiplication and the fixed point multiplication in response to a control signal B. The change over circuit 14 is provided to use the circuit of the present embodiment as a fixed point arithmetic circuit, too.

Figure 3:
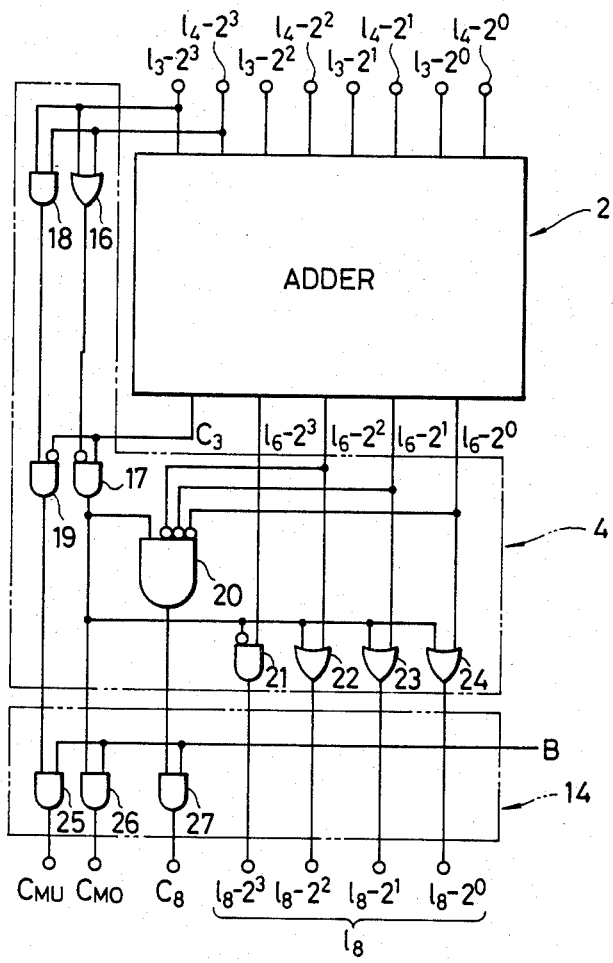
FIG. 3 is a circuit diagram showing blocks 2, 4 and 14 of FIG. 2.

FIG. 3 shows the circuit constructions of the adder 2, the over flow detector and compensation circuit 4 and the change over circuit 14 thus far described. In FIG. 3: $l_3-2^3$, $l_3-2^2$, $l_3-2^1$ and $l_3-2^0$ indicate the four bit signals belonging to the input $A_1$ and having the exponent $e_1$; $l_4-2^3$, $l_4-2^2$, $l_4-2^1$ and $l_4-2^0$ indicate the four bit signals belonging to the input $A_2$ and having the exponent $e_2$; $l_6-2^3$, $l_6-2^2$, $l_6-2^1$ and $l_6-2^0$ indicate the output signals of the adder 2, i.e., the four bit signals having the exponent e; and $C_3$ indicates a carry signal for under three-bit addition. An OR circuit 16 and an AND circuit 17 are circuits for detecting that the exponent e of the product A is not less than $2^{n-1}$ (in the case of the exponent's over-flow) so that the output $C_{MO}$ becomes "1" when the $l_3-2^3$ and $l_4-2^3$ are "0" and the carry signal $C_3$ is "1" (i.e., $C_{MO} = \overline{(l_3-2^3)+(l_4-2^3)} \cdot C_3$). An OR circuit 18 and an AND circuit 19 are circuits for detecting that the exponent e is not more than $-8$ (in the case of the exponent's under-flow) so that the output $C_{MU}$ becomes "1" when the $l_3-2^3$ and $l_4-2^3$ are "1" and the $C_3$ is "0". An AND circuit 20 is a circuit for detecting that the exponent e is $2^{n-1}$ (e.g., 8 for n=4) so that it feeds out "1" when the $C_{MO}$ is "1" and all of the $l_6-2^2$, $l_6-2^1$ and $l_6-2^0$ are "0" (i.e., $C_{MO} \cdot \overline{(l_6-2^2)} \cdot \overline{(l_6-2^1)} \cdot \overline{(l_6-2^0)} =$ "1"). An AND circuit 21 and OR circuits 22, 23 and 24 compensate the exponent e to $e_0=$ "0111" when the exponent is not less than $2^{n-1}$ (=8). The floating and fixed point arithmetic change over circuit 14 is used, when the arithmetic types are changed, so that the control signal B is "1" in the case of the floating point arithmetic thereby to render AND circuits 25, 26 and 27 conductive thereby to pass the signals $C_{MU}$, $C_{MO}$ and $C_8$ therethrough. In the case of the fixed point arithmetic, the control signal B is "0" so that the signals $C_{MU}$, $C_{MO}$ and $C_8$ are blocked.

Figure 4:
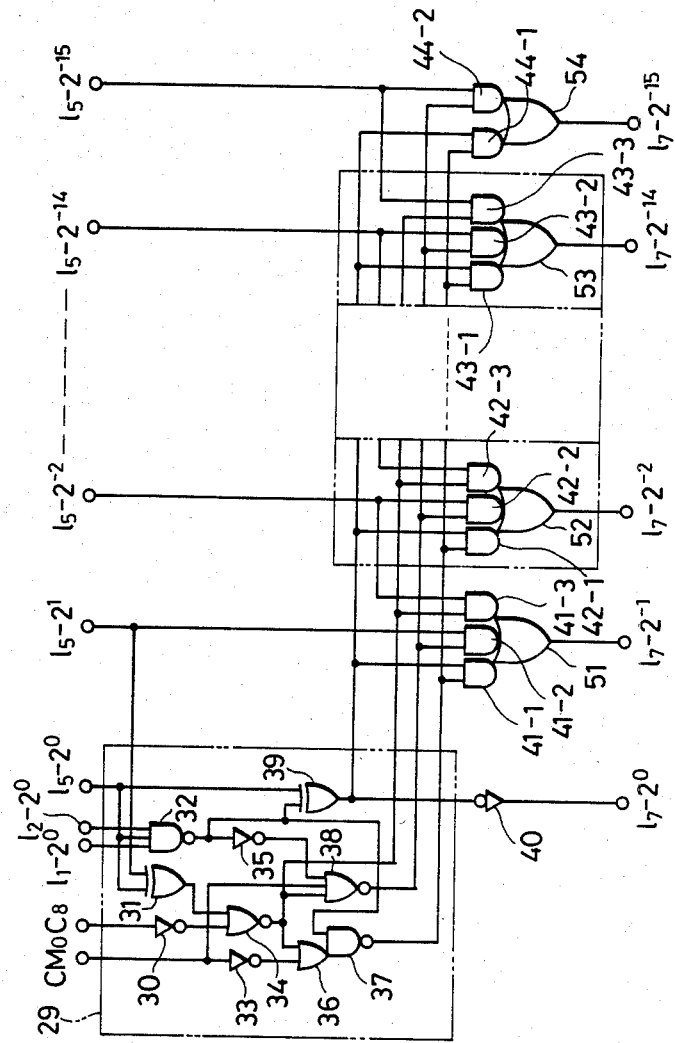
FIG. 4 is a circuit diagram showing a block 3 of FIG. 2.

FIG. 4 is a circuit diagram of an overflow detector and compensation circuit 3 of FIG. 2, which receives as its inputs the signals $C_{MO}$ and $C_8$ shown in FIG. 3, with the MSB $l_1-2^0$ and $l_2-2^0$ of the two input signals $l_1$ and $l_2$ to be multiplied, and with the signals $l_5-2^0$, $l_5-2^{-1}$, $---$, and $l_5-2^{-15}$ having 16 bits and generated, i.e., the output $C_{MU}$ of the multiplier 1. A logic circuit 29 is composed of inverters 30, 33 and 35, exclusive OR circuits 31 and 39, NAND circuits 32 and 37, NOR circuits 34 and 38 and an OR circuit 36 and judges the various states of the result of multiplication thereby to turn on and off AND gates 41 to 44. OR circuits 51 to 54 extract the outputs of those AND gates and feed out bit signals $l_7-2^{-1}$, $l_7-2^{-2}$, $---l_7-2^{-15}$ which express the mantissas compensated. The output $l_7-2^0$ of an inverter 40 becomes the MSB signal of the mantissa.

By the actions of the circuits thus far described with reference to FIGS. 3 and 4, the $C_{MO}$ becomes "1", when the exponent e is not less than 8 (i.e., in the case of the exponent's over-flow), so that the exponents $e_0$ (e.g., $l_8-2^3$, $l_8-2^2$, $l_8-2^1$ and $l_8-2^0$) become "0111" (+7). For the mantissa: as shown in FIG. 4, when the $C_{MO}$ is "1" and is not normalized, the NAND circuit 37 takes "1" to turn on AND gates 41-1, 42-1, ---, and 44-1; and, when the MSB $l_5-2^0$ is "0" or "1", the output bits $l_7-2^0$, $l_7-2^{-1}$, $l_7-2^{-2}$, $---$, and $l_7-2^{15}$ having their mantissas compensated take the values having the maximum absolute values, such as, 0.11111 --- 1 or 1.000 - --0, for the mantissa inputs other than $-1$.

However, in case the exponent e is $2^{n-1}(=8)$ and the mantissa is not normalized, i.e., when the $C_{MO}$ and $C_8$ are "1" and when the signs of the $l_5-2^0$ and $l_5-2^{-1}$ are identical, AND gates 41-3, 42-3 and so on are turned on by the logic circuit 29 thereby to shift the mantissa only one bit to the left.

For the exponent e defined by $-8 \leq e < 7$, no overflow takes place so that the output $l_6$ of the adder 2 of the exponent is extracted as $l_8$ ($l_8-2^3$, $l_8-2^2$, ---, and $l_8-2^0$), whereby the exponent is not normalized.

Now, in the foregoing respective cases, the mantissa's over-flow takes place when both the mantissas $M_1$ and $M_2$ of the two inputs $A_1$ and $A_2$ are "1.000 --- 0" ($-1$). This detection is performed by the NAND circuit 32 of FIG. 4 so that, when it is detected that the $(l_1-2^0)\cdot(l_2-2^0)\cdot(l_5-2^0)$ is "1", the compensated mantissa outputs $l_7-2^0$, $l_7-2^{-2}$, ---, and $l_7-2^{-15}$ take "0.1111 --- 1" ($=2^0-2^{15}$).

Next, the compensation circuit in the case of the exponent's under-flow, i.e., when the exponent e is smaller than $-2^{n-1}$ will be described in the following.

When the arithmetic result of the floating point multiplier is to be directly extracted, it is sufficient to shift (or carry down) the mantissa to the right by $(-2^{n-1}-e)$ bits for the minimum value $-2^{n-1}$ that can be indicated by the exponent. However, since a third input $A_3$ is generally added to the result of the first arithmetic circuit I in most cases, the embodiment shown in FIG. 2 is directed to the case in which the compensation of the exponent's under-flow is performed by the second arithmetic circuit II in the course of the addition of the third input $A_3$ ($l_9$ and $l_{10}$).

The output A of the multiplier I and the third input $A_3$ are numbers expressed in floating points and are expressed by the following Equations:

$$A = M_\beta \cdot 2^\beta; \text{ and}$$

$$A_3 = M_\alpha \cdot 2^\alpha.$$

Now, if it is assumed that the two numbers A and $A_3$ in the relationship of $\alpha \eta \beta$ are added, the result of addition Z is expressed by the following Equation:

$$Z = A + A_3 = [M_\alpha + M_\beta \cdot 2^{-(\alpha-\beta)}] \cdot 2^\alpha.$$

In FIG. 2, the mantissas $M_\beta$ and $M_\alpha$ are applied as $l_7$ and $l_9$, respectively, to a mantissa input but change over circuit 5. The exponents $\beta$ and $\alpha$ are applied as $l_8$ and $l_{10}$, respectively, to an exponent compensation circuit 6, an exponent comparison circuit 11 and a mantissa change over circuit 13. The exponent comparison circuit 11 compares the magnitudes of the above exponents $\alpha$ and $\beta$ and adds the result of comparison $l_{17}$ as the signal $l_{18}$ through an exponent comparison compensation circuit 12 to the above change over circuits 5 and 13 and to a subtractor 7. Here, $l_{17}=0$ holds for $\alpha \eta \beta$. The above mantissa input bus change over circuit 5 generates the mantissa $M_\alpha$, which corresponds to the larger exponent $\alpha$, at $l_{16}$ and the mantissa $M_\beta$, which corresponds to the smaller exponent $\beta$, at $l_{14}$ and applies it to a shift circuit 9. On the other hand, the exponent input bus change over circuit 13 generates the larger exponent $\alpha$ and adds it to another circuit (although not shown).

The subtractor 7 receives the exponents $\alpha$ and $\beta$ in two's complement expression thereby to calculate $|\alpha-\beta|$ and feed out the arithmetic result in binary expression. This output is then applied through a shift compensation circuit 8 and an arithmetic change over circuit 15 to the above shift circuit 9 thereby to shift the mantissa $M_\beta$ to the right by the $(\alpha-\beta)$ bit length. The signal $l_{15}$, which is shifted by the shift circuit 9, is added to the signal $l_{16}$ ($=M_\alpha$) by the fixed point adder and subtractor thereby to feed out the result of addition of $M_\alpha + M_\beta \cdot 2^{-(\alpha-\beta)}$.

Figure 5:
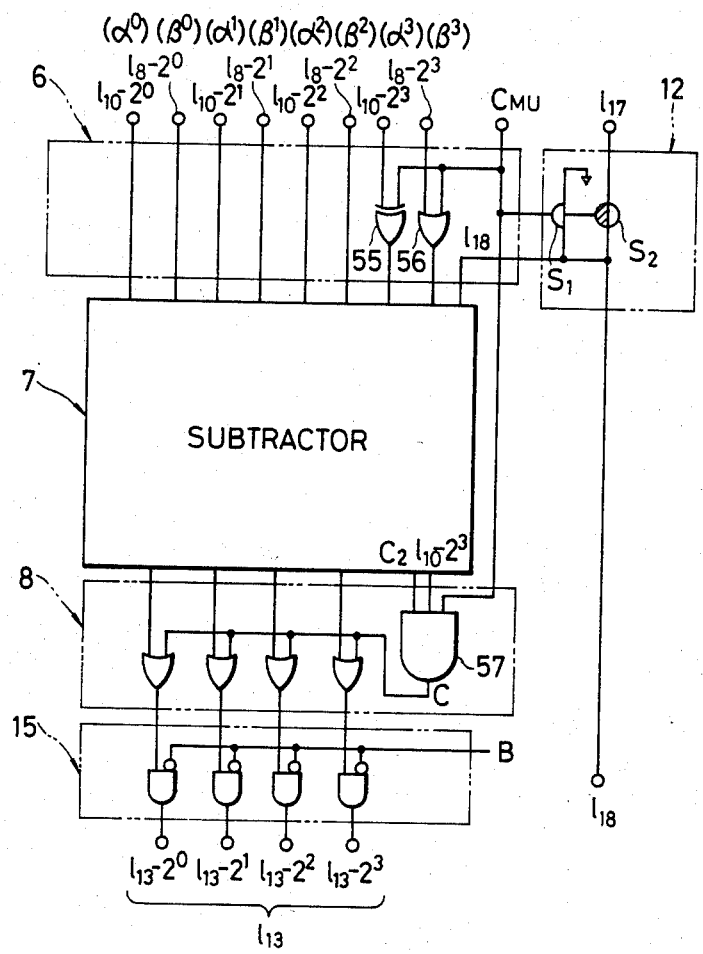
FIG. 5 is a circuit diagram showing blocks 6, 7, 8 and 15 of FIG. 2.

In the construction thus far described, the exponent compensation circuit 6, the exponent comparison compensation circuit 12 and a shift compensation circuit 8 are also made operative to perform the exponent compensating function for the exponent's under-flow, when this exponent's under-flow takes place in the exponent $M_\beta$ of the aforementioned floating point multiplication arithmetic circuit I, i.e., when the $C_{MU}$ is "1", and their concrete constructions will be described with reference to FIG. 5.

Prior to the description of the circuit of FIG. 5, its operating principle will be described.

Here, the exponent of the output of the arithmetic circuit I is designated at $\beta = \{\beta_3, \beta_2, \beta_1, \beta_0\}$, and the true value of the exponent is designated at e. Incidentally, $\beta$ indicates the output in the case of the under-flow. On the other hand, the exponent of the other input is designated at $\alpha = \{\alpha_3, \alpha_2, \alpha_1, \alpha_0\}$ (which is expressed by $l_{10}$).

The exponent's under-flow takes place for $\overline{\beta_3} \cdot C_{MU} = $"1". At this time, since $e < -8$ and $\beta \geq 0$ in the two's complement expression of four bits, $e < \beta$. As a result, when $C_{MU}$ is 1, the compensation of the exponent comparison has to be performed. In order to arrange the exponents of the two inputs, it is necessary to deduce $(\alpha - e)$, which is expressed by the following Equation:

$$\alpha - e = \alpha - (-16 + \beta) = (\alpha + 8) - (-8 + \beta) \tag{3}$$

Here, since $\alpha$ and $\beta$ are defined by the following conditions:

$$-8 \leq \alpha \leq 7; \quad (4)$$

$$0 \leq \beta \leq 7 \quad (5)$$

$$0 \leq \alpha + 8 \leq 15; \text{ and} \quad (6)$$

$$-8 \leq -8 + \beta \leq -1. \quad (7)$$

the following inequalities hold:

$$\alpha + 8 > -8 + \beta \quad (8)$$

and $$1 \leq \alpha - e \leq 23 \quad (9).$$

On the other hand, since the input data $l_{13}$ to the mantissa's shift right circuit 9 has to be restricted by an equality of $0 \leq l_{13} \leq 15$, the following compensations are required:

$$\text{for } \alpha - e < 16, \, l_{13} = \alpha - e \quad (10);$$

and $$\text{for } \alpha - e \geq 16, \, l_{13} = 15 \quad (11).$$

If the above Equations are expressed by logic symbols for the circuit construction, the terms $(\alpha+8)$ and $(-8+\beta)$ of the Equation (3) are expressed by the following Equations:

$$(\alpha+8) = \{(\alpha_3 \oplus 1)\alpha_2\alpha_1\alpha_0\}$$

$$= \{(\alpha_3 \oplus C_{MU})\alpha_2\alpha_1\alpha_0\} \quad (12);$$

where $\{\ \}$ implies a series of bits; $(\alpha_3 \oplus C_{MU})$ and $\alpha_0$ imply the MSB and LSB, respectively; and where the Equation (12) is not in the two's complement expression but in the binary expression; and $$(-8+\beta) = \{(1+0)\beta_2\beta_1\beta_0\} \, (\because \beta_3 = 0)$$

$$= \{(\beta_3 + C_{MU})\beta_2\beta_1\beta_0\} \quad (13),$$

where this Equation is in the two's complement expression. If x and y given by the following Equations are used, $$x = (C_{MU} \oplus \alpha_3) = \overline{\alpha_3} \quad (14)$$

$$y = (\overline{C_{MU} + \beta_3}) = 0 \quad (15)$$

the conditions for the Equations (10) and (11) are such that the Equation (10) holds, when C defined by the following Equations is "0", whereas the Equation (11) holds when the C is "1":

$$C = \{x \cdot y + (x \oplus y) \cdot C_2\} \cdot C_{MU} \quad (16)$$

$$= x \cdot C_2 \cdot C_{MU} \quad (17).$$

In FIG. 5: signals $l_8 - 2^3$, $l_8 - 2^2$, $l_8 - 2^1$ and $l_8 - 2^0$ correspond to the above $\beta_3$, $\beta_2$, $\beta_1$ and $\beta_0$; and signals $l_{10} - 2^3$, $l_{10} - 2^2$, $l_{10} - 2^1$ and $l_{10} - 2^0$ correspond to the above $\alpha_3$, $\alpha_2$, $l_1$ and $l_0$. An exclusive OR circuit 55 performs the calculation of the term $(\alpha_3 \oplus C_{MU})$ appearing in the Equation (12), and an OR circuit 56 performs the calculation of the term $(\beta_3 + C_{MU})$ appearing in the Equation (14). The exponent comparison compensation circuit 12 turns on a switch $S_1$ and off a switch $S_2$, when $C_{MU} = 1$, thereby to reduce the signal $l_{18}$ to "0". This is reversed for $C_{MU} = $"0" so that the signal $l_{18}$ becomes "$l_{17}$". The substractor 7 feeds out the value $(\alpha - e)$. In the shift compensation circuit 8, the condition C of the foregoing Equation (17) is judged by an AND circuit 57 so that the output "1" is fed out for the shift larger than 16. Hence, the value 15 is set as the shift signal $l_{13}$ for $\alpha - e \geq 16$, whereas the value $(\alpha - e)$ is set as the signal $l_3$ for $\alpha - e < 16$.

Although the foregoing description has been directed to the case in which the compensation of the exponent's underflow is performed during the addition and subtraction of the remaining input $A_3$, it is sufficient that the data of the mantissa $l_9$ of the input signal $A_3$ is set at 0 whereas the data $l_{10}$ of the same is set at $-8$, in case the result of the multiplication of the two input data $A_1$ and $A_2$ is to be directly extracted as the output of the second arithmetic circuit II. Specifically, $(000 \text{- - -} 0) \times 2^{-8} = 0$ holds, and this is the output added by 0 so that the product $A_0$ of the two inputs $A_1$ and $A_2$ is obtained.

We claim:

1. An arithmetic circuit for compensation of overflow and underflow in the processing of numbers in two's complement representation comprising first circuit means having a multiplier for multiplying the mantissas of first and second floating point numbers in two's compliment representation and an adder for adding the exponents of said first and second floating point numbers; and second circuit means for adding the outputs of said multiplier and said adder to a third floating point number in two's complement representation; wherein said first circuit means includes first detector means connected to said adder for detecting over- and underflow conditions of the output of said adder, first compensation means connected to said adder for compensating the output of said adder for a detected over-flow condition prior to application of said output of said second circuit means, second detector means connected to said multiplier means for detecting over-flow of the output of the multiplier resulting from multiplication of said mantissas and second compensation means connected to said multiplier for compensating said overflow of the output of said multiplier prior to application of said output to said second circuit means; and wherein said second circuit means includes third compensating means responsive to the output of said first detector means for compensating the output of said adder in said first circuit means for a detected underflow condition as part of the adding operation of said second circuit means.

2. Arithmetic circuit according to claim 1, wherein the number of bits by which said adder can represent a result is n (n is an integer not less than 2) and said third number has an exponent $\alpha$, said third floating point compensation means including means for shifting the output of said multiplier to the right by $(\alpha - e)$ bits (e is the true value of the output of said adder) when said first detector detects an exponent under-flow condition at the output of said adder.

3. Arithmetic circuit according to claim 2, wherein said first compensating means includes means for setting the outputs of said adder to $2^{n-1} - 1$ when said first detector means detects that the output of said adder is more than $2^{n-1}$ or is $2^{-n-1}$, and said second compensating means includes means for shifting the output of said multiplier one bit to the left when said first detector means detects that the output of said adder if $2^n-1$ and when the output of said multiplier is not normalized, and means for maximizing the absolute value of the output of said multiplier without changing the sign bit of the same when the output of said adder, is not less than $2^{n-1}+1$ or when the output of said multiplier is normalized and the output of said adder is $2^{-n-1}$.

4. Arithmetic circuit according to claims 2 or 3, wherein said second compensation means includes means for shifting the output of said multiplier one bit to the right and for adding one to the output of said adder when said second detector means detects an overflow condition in the multiplication of said mantissas.

* * * * *